June 22, 1954      J. H. HOLLAND      2,681,972
THAWING DEVICE
Filed Nov. 28, 1952
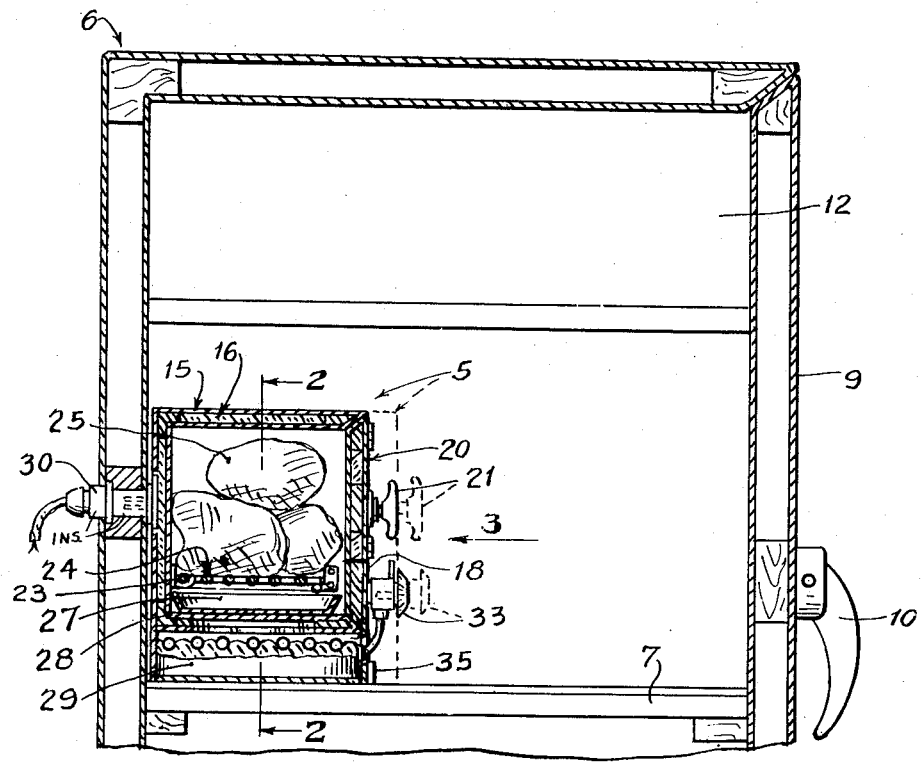
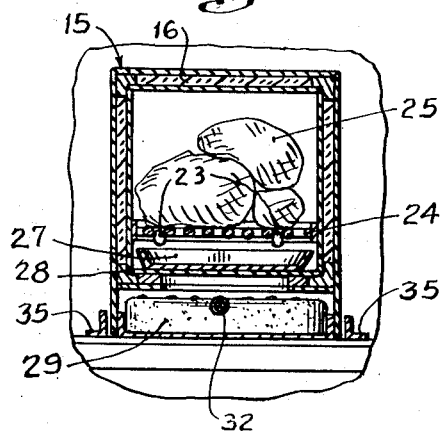
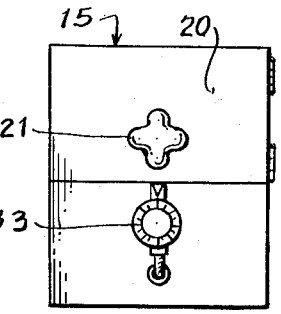
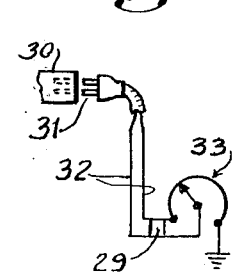
INVENTOR
JESSE H. HOLLAND
BY Albert H. Merrill
ATTORNEY Patented June 22, 1954

2,681,972

UNITED STATES PATENT OFFICE 2,681,972

THAWING DEVICE

Jesse Harold Holland, Redondo Beach, Calif.

Application November 28, 1952, Serial No. 322,929

2 Claims. (Cl. 219—19)

This invention relates to a thawing device and more particularly to a device for thawing refrigerated foods in a time economizing manner.

Housewives and other users of refrigerators often have occasion quickly to prepare for use food contained in a refrigerator in a frozen or nearly frozen condition, and, therefore, feel the need of a device which will, in a speedy and economical manner, thaw out or considerably raise the temperature of the removed food, thus placing it in a condition for being readily cooked, or placed on the dining table.

It is an object of the present invention to supply the above stated need by providing, within a refrigerator a specially temperature insulated box equipped with means to heat its contents, so that the food which it contains can be thawed or defrosted inside the refrigerator without materially increasing the temperature within the refrigerator outside of said insulated box.

Also it is an object of the invention to provide a thawing device provided with electric heating means, wherein the heater may be energized either through a plug-in means carried internally by a refrigerator or by being connected to a conventional electrical wall outlet.

Other objects, advantages and features of invention will hereinafter appear.

Referring to the accompanying drawing, which illustrates a preferred embodiment of the invention, Fig. 1 is a vertical section showing the device installed in a conventional refrigerator, which is fragmentarily shown. The broken lines indicate withdrawal of the device from the plug-into member.

Fig. 2 is a vertical section on line 2—2 of Fig. 1.

Fig. 3 is an elevational front view of the device looking at its dial and temperature setting means, the viewpoint of the observer being indicated by the arrow 3 on Fig. 1.

Fig. 4 is a wiring diagram.

Referring in detail to the drawing, the thawing device 5 is mounted within a fragmentarily shown refrigerator 6 having a shelf 7 which supports said device. Said refrigerator is shown as having conventional hollow walls to receive a heat insulating material. Also the refrigerator door 9 having a handle 10 is shown having a hollow interior. The upper part of the refrigerator contains a conventional temperature reducing means 12.

The aforesaid thawing device 5 comprises a box or casing 15 with hollow top, bottom and side walls all containing a heat insulating material 16, these walls including a front side wall 18 which closes only the lower part of the front side of said casing 15, the space above said front wall 18 affording a door opening which is normally closed by a swingable door 20 having an operating handle 21.

Within the lower part of said casing 15 is removably supported, by cleats 23, an open grate 24 to have deposited upon it foodstuff 25 insertable through the aforesaid door opening. Below said grate is shown a metallic dripping pan 27 removably mounted upon supports 28.

Upon the bottom portion of the casing 15 is mounted a conventional electric heater 29 the current to which is supplied through the refrigerator wall from a plug-into attachment 30, plug-in means 31 and thence through conductors 32, to the heater 29, this current supply being regulated by a conventional, manually adjustable temperature control means 33. This control means can be pre-set to cause the foodstuff 25 to be thawed out by the time desired.

A pair of angular rails 35 on shelf 7 guide the backward movement of the casing 5 to cause the plug-in means 31 to register with the plug-into member 30 and to complete the circuit through the heater of the thawing device when the latter is pushed back to the limit of its travel.

It is to be understood that this thawing device may be used outside of the refrigerator, in which case the plug-in member 31 thereof will be electrically connected with a conventional wall outlet or with a cord-carried plug-into member. In either case the housewife or cook will have at hand a convenient, sanitary means in which the meat or other food being thawed out will be kept in a closed-in, protected condition. When the food to be thawed is placed within the device the thermostatic control 33 will be set to time the thawing of the food so that it will be ready for cooking or serving at the desired time. During operation the heat from the heater 29 will readily pass up to the food through the metal drip pan 27 and open grate 24.

I claim:

1. In combination, a refrigerator having a vertical side wall with a plug-into connection therethrough connected with an outside source of electric current, and a thawing device consisting of a casing having temperature insulated walls, there being a door opening in one side of said casing considerably spaced above the bottom of the casing, a door mounted upon said casing to open and close said door opening, a horizontal grate removably supported in said casing considerably spaced above the bottom thereof and slightly below said door opening and in a position to have deposited upon it foodstuff to be thawed inserted through said door opening, a dripping pan removably supported within said casing subjacent to said grate, an electric heater within said casing below said pan, a plug-in connection carried by said casing and electrically connecting said heater with the aforesaid plug-into connection carried by the refrigerator, and a manually adjustable thermostatic control for said heater carried externally by said casing below said door opening.

2. In combination, a refrigerator having a vertical side wall with a plug-into connection therethrough connected with an outside source of electric current and a floor with parallel guide rails mounted thereon, and a thawing device consisting of a casing having temperature insulated walls, an electric heater within said casing, a plug-in connection carried by said casing and electrically connecting said heater with the aforesaid plug-into connection carried by the refrigerator, and a manually adjustable thermostatic control for said heater carried externally by said casing, said casing being backwardly movable within said refrigerator between said rails to a position wherein said plug-in connections register with each other.

References Cited in the file of this patent

UNITED STATES PATENTS

| Number    | Name     | Date           |
|-----------|----------|----------------|
| 1,661,354 | Ayre     | Mar. 6, 1928   |
| 1,979,222 | Goodwin  | Oct. 30, 1934  |
| 2,187,196 | Douglass | Jan. 16, 1940  |
| 2,223,234 | Stemme   | Nov. 26, 1940  |
| 2,253,971 | Dodge    | Aug. 26, 1941  |
| 2,303,806 | Wild     | Dec. 1, 1942   |
| 2,311,446 | Knight   | Feb. 16, 1943  |
| 2,378,816 | Wild     | June 19, 1945  |
| 2,429,512 | Fuller   | Oct. 21, 1947  |